US011326755B2

(12) United States Patent
Tai et al.

(10) Patent No.: US 11,326,755 B2
(45) Date of Patent: May 10, 2022

(54) VEHICLE LIGHT

(71) Applicant: MIN HSIANG CORPORATION, Tainan (TW)

(72) Inventors: Shang-Kuei Tai, Taipei (TW); I-Ta Tu, Tainan (TW); Hui-Ching Cheng, Tainan (TW)

(73) Assignee: MIN HSIANG CORPORATION, Tainan (TW)

( * ) Notice: Subject to any disclaimer, the term of this patent is extended or adjusted under 35 U.S.C. 154(b) by 0 days.

(21) Appl. No.: 16/909,292

(22) Filed: Jun. 23, 2020

(65) Prior Publication Data
US 2021/0372584 A1 Dec. 2, 2021

(30) Foreign Application Priority Data
May 27, 2020 (TW) .................................. 109117725

(51) Int. Cl.
*F21V 9/00* (2018.01)
*F21S 41/24* (2018.01)
(Continued)

(52) U.S. Cl.
CPC ............. *F21S 41/24* (2018.01); *F21S 41/143* (2018.01); *F21S 41/19* (2018.01); *F21S 41/337* (2018.01); *F21S 43/14* (2018.01); *F21S 43/19* (2018.01); *F21S 43/239* (2018.01); *F21S 43/243* (2018.01); *F21S 43/249* (2018.01); *F21S 43/31* (2018.01); *G02B 6/0016* (2013.01);
(Continued)

(58) Field of Classification Search
CPC .......... F21S 43/14; F21S 43/249; F21S 41/19; F21S 41/337; F21S 43/31; F21S 41/143; F21Y 2115/10; F21Y 2105/18; G02B 6/0036; G02B 6/0031; G02B 6/0016
See application file for complete search history.

(56) References Cited

U.S. PATENT DOCUMENTS 8,052,313 B2  11/2011  Sassoon
8,319,653 B2  11/2012  Takebe et al.
(Continued)

FOREIGN PATENT DOCUMENTS

TW    M308876 U    4/2007
TW    M403590 U    5/2011
(Continued)

*Primary Examiner* — Omar Rojas Cadima
(74) *Attorney, Agent, or Firm* — Karin L. Williams; Alan D. Kamrath; Mayer & Williams PC

(57) ABSTRACT

A vehicle light includes a base having a compartment. At least one first light emitter and a plurality of second light emitters are disposed on a circuit board mounted in the compartment. A reflective seat is disposed in the compartment and is located in front of the first and second light emitters. The reflective seat includes at least one hollow portion aligned with the at least one first light emitter and at least one first reflective face substantially surrounding the at least one hollow portion. The at least one first light emitter is configured to emit light rays which are reflected forwards by the at least one first reflective face. A lens includes a light incoming face and a light outgoing face. The plurality of second light emitters is configured to emit light rays which are incident to the light incoming face and which exits via the light outgoing face.

19 Claims, 10 Drawing Sheets

(51) Int. Cl.
*F21S 41/33* (2018.01)
*F21V 8/00* (2006.01)
*F21S 41/143* (2018.01)
*F21S 43/14* (2018.01)
*F21S 43/19* (2018.01)
*F21S 43/239* (2018.01)
*F21S 43/249* (2018.01)
*F21S 43/31* (2018.01)
*F21S 43/243* (2018.01)
*F21S 41/19* (2018.01)
*F21Y 105/18* (2016.01)
*F21Y 115/10* (2016.01)

(52) U.S. Cl.
CPC ......... *G02B 6/0031* (2013.01); *G02B 6/0036* (2013.01); *F21Y 2105/18* (2016.08); *F21Y 2115/10* (2016.08)

(56) References Cited

U.S. PATENT DOCUMENTS

| | | | |
|---|---|---|---|
| 9,328,885 B2 | 5/2016 | Ichikawa et al. | |
| 10,488,011 B2 | 11/2019 | Norris et al. | |
| D872,328 S | 1/2020 | Kim et al. | |
| 2009/0190372 A1 | 7/2009 | Su | |
| 2011/0194282 A1* | 8/2011 | Paik | F21V 5/007 362/245 |
| 2012/0092852 A1* | 4/2012 | Doan | F21K 9/64 362/84 |
| 2013/0229801 A1* | 9/2013 | Breidenassel | F21K 9/68 362/235 |
| 2014/0268872 A1* | 9/2014 | Holman | G02B 6/0083 362/608 |
| 2017/0292674 A1* | 10/2017 | Wu | B60Q 1/0052 |
| 2020/0072431 A1 | 3/2020 | Shih | |

FOREIGN PATENT DOCUMENTS

| | | |
|---|---|---|
| TW | M423784 U | 3/2012 |
| TW | M482527 U | 7/2014 |
| TW | I451044 B | 9/2014 |
| TW | M501520 U | 5/2015 |
| TW | M507486 U | 8/2015 |

* cited by examiner

VEHICLE LIGHT

BACKGROUND OF THE INVENTION

The present invention relates to a vehicle light and, more particularly, to a vehicle light capable of outputting a better lighting pattern while reducing the components of the vehicle light.

Conventional vehicle lights generally include light emitters arranged in two different patterns or colors so as to provide different functions to thereby serve as alarm lights, brake lights, or directional lights. FIG. 10 shows a conventional vehicle light disclosed in Taiwan Utility Model No. 308876. The conventional vehicle light includes a base 1', a circuit board 2', a plurality of first light emitters 3', a plurality of second light emitters 4', a first light guiding seat 5', and a second light guiding seat 6'. The base 1' includes an annular wall 11' having a compartment 12' in a center thereof. The circuit board 2' is slightly smaller than the size of the compartment 12'. The plurality of first light emitters 3' is disposed on a central portion of the circuit board 2'. The plurality of second light emitters 4' is disposed on a peripheral portion of the circuit board 2'. The first light guiding seat 5' is located in front of and aligned with the plurality of first light emitters 3' and includes a plurality of light guiding holes 51' for concentrating light. The second light guiding seat 6' is located in front of and aligned with the plurality of second light emitters 4' and includes a plurality of light guiding holes 61' for concentrating light. Thus, the light rays emitted from the plurality of first and second light emitters 3' and 4' can be concentrated by the light guiding holes 51' and 61' and then move forwards, such that the first and second light emitters 3' and 4' can provide an alarming effect.

The above conventional vehicle light using the plurality of first and second light emitters 3' and 4' on the circuit board 2' provides a large-area lighting pattern in dot-type distribution. Such a structure requires a sufficient number of the first and second light emitters 3' and 4' to present a large-area illuminating alarming effect, increasing the costs of the light emitters. Furthermore, although the first and second light guiding seats 5' and 6' can respectively concentrate the light rays emitted from the plurality of first and second light emitters 3' and 4' to avoid mixing of the light rays, the vehicle light can only output the lighting pattern corresponding to the locations of the plurality of first and second light emitters 3' and 4' in dot-type distribution. Namely, the lighting pattern is limited to the distribution range of the plurality of first and second light emitters 3' and 4'.

U.S. Pat. No. 8,052,313 discloses a combination lamp including a first lamp assembly and a second lamp assembly surrounding the first lamp assembly. The first and second lamp assemblies can be combined together. The first lamp assembly includes a plurality of LEDs, and the second lamp assembly includes a plurality of annularly disposed LEDs. The output range provided by the combination lamp is still limited by the distribution area of the LEDs, such that a large-area illumination requires a large quantity of LEDs, resulting in an increase in the costs of the LEDs. Furthermore, the combination lamp can only output dot-type lighting pattern. The lighting pattern is limited to the distribution area of the LEDs.

U.S. Pat. No. 10,488,011 discloses a multi-colored vehicle rear lamp including a housing receiving a circuit board having first, second, and third light emitters emitting light rays of different colors. The vehicle rear lamp further includes a light transmissive cover disposed in front of the first, second, and third light emitters. The light transmissive cover includes a first illuminated surface area and a second illuminated surface area different from the first illuminated surface area in color. The light transmissive cover can output colored lighting patterns. However, the light output area of the multi-colored vehicle rear lamp can only correspond to the distribution area of the first, second, and third light emitters. Namely, the outputted lighting pattern is limited to the distribution range of the first, second, and third light emitters.

BRIEF SUMMARY OF THE INVENTION

An objective of the present invention is to provide a vehicle light capable of outputting a better lighting pattern while reducing the components of the vehicle light.

In a first aspect of the present invention, a vehicle light, including a longitudinal axis extending in a front-rear direction, comprises a base and a circuit board. The base includes a compartment having an opening at a front end thereof. The circuit board is mounted in the compartment of the base. At least one first light emitter and a plurality of second light emitters are disposed on the circuit board. A reflective seat is disposed in the compartment of the base and is located in front of the at least one first light emitter and the plurality of second light emitters. The reflective seat includes a central portion having at least one first reflective face and at least one hollow portion. The at least one first reflective face substantially surrounds the at least one hollow portion. The at least one hollow portion is aligned with the at least one first light emitter. The at least one first light emitter is configured to emit light rays which are reflected forwards by the at least one first reflective face. A lens includes a light incoming face and a light outgoing face. The plurality of second light emitters is configured to emit light rays which are incident to the light incoming face and which exits via the light outgoing face.

In an example, the circuit board includes a front surface, and wherein the at least one first light emitter and the plurality of second light emitters are disposed on the front surface of the circuit board.

In an example, the plurality of second light emitters is disposed on the front surface of the circuit board and surrounds the longitudinal axis. A spacing between each of the plurality of second light emitters and the longitudinal axis is larger than a spacing between the at least one first light emitter and the longitudinal axis.

In an example, the lens includes a plurality of first microstructures disposed on the light outgoing face.

In an example, the lens includes a plurality of second microstructures disposed on the light incoming face.

In an example, the lens is mounted in the compartment of the base 1 and is located in front of the circuit board. The lens includes a through-hole having a diameter larger than a distribution area of the plurality of second light emitters.

In an example, the lens further includes an extension portion and a light output portion. The light incoming face is located on an annular wall of the through-hole. The extension portion extends from the light incoming face away from the longitudinal axis in a first direction approximately perpendicular to the longitudinal axis. The light output portion is located on an end of the extension portion remote from the longitudinal axis. The light outgoing face is located at a front end of the light output portion. The light rays emitted from the plurality of second light emitters and incident to the light incoming face are reflected by the extension portion and the light output portion and then exit forwards via the light outgoing face.

In an example, the extension portion of the lens includes a first face and a second face substantially parallel to the first face and spaced from the first face in the first direction. The light output portion includes a third face. The third face extends forwards away from the longitudinal axis, and is connected to the second face. The light output portion extends forwards in a direction substantially parallel to the longitudinal axis. The light outgoing face located at the front end of the light output portion is substantially perpendicular to the longitudinal axis.

In an example, the second face of the lens includes a pattern portion.

In an example, the pattern portion is a texture structure.

In an example, the lens includes a plurality of third microstructures disposed on the third face.

In an example, an acute angle between the third face and a horizontal axis is smaller than 48°, and wherein the horizontal axis is perpendicular to the longitudinal axis.

In an example, the lumen of the light rays from the light outgoing face is about 45-50% of the total lumen of the light rays emitted from the plurality of second light emitters.

In an example, a front cover transmittable to light is disposed at the opening at the front end of the base and is configured to close the compartment.

In an example, the light outgoing face of the lens is contiguous or adjacent to the front cover.

In an example, the reflective seat includes an annular portion surrounding the longitudinal axis, extending forwards, and tapering rearwards. The at least one hollow portion is located in a center of the annular portion. The reflective seat further includes a second reflective face located at a rear end of the annular portion and located in front of the plurality of second light emitters. The second reflective face is configured to reflect the light rays from the plurality of second light emitters to the light incoming face of the lens.

In an example, the light incoming face of the lens is contiguous or adjacent to the second reflective face.

In an example, the second reflective face is a multi-focus curved face.

In an example, the reflective seat includes an annular portion surrounding the longitudinal axis, extending forwards, and tapering rearwards. The reflective seat further includes a side annular portion extending radially outwards from a front end of the annular portion and abutting the first face of the lens.

In a second aspect of the present invention, a vehicle light comprises a base including a compartment having an opening at a front end thereof, at least one first light emitter, and a plurality of second light emitters. A reflective seat is disposed in the compartment of the base and is located in front of the at least one first light emitter and the plurality of second light emitters. The reflective seat includes a central portion having at least one first reflective face and at least one hollow portion. The at least one first reflective face substantially surrounds the at least one hollow portion. The at least one hollow portion is aligned with the at least one first light emitter. The at least one first light emitter is configured to emit light rays which are reflected forwards by the at least one first reflective face. A lens includes a light incoming face and a light outgoing face. The plurality of second light emitters is configured to emit light rays which are incident to the light incoming face and which move outwards via the light outgoing face. The reflective seat includes an annular portion surrounding the longitudinal axis, extending forwards, and tapering rearwards. The at least one hollow portion is located in a center of the annular portion. The reflective seat further includes a second reflective face located at a rear end of the annular portion and located in front of the plurality of second light emitters. The second reflective face is configured to reflect the light rays from the plurality of second light emitters to the light incoming face of the lens.

The present invention will become clearer in light of the following detailed description of illustrative embodiments of this invention described in connection with the drawings.

DETAILED DESCRIPTION OF THE INVENTION

Figure 1:
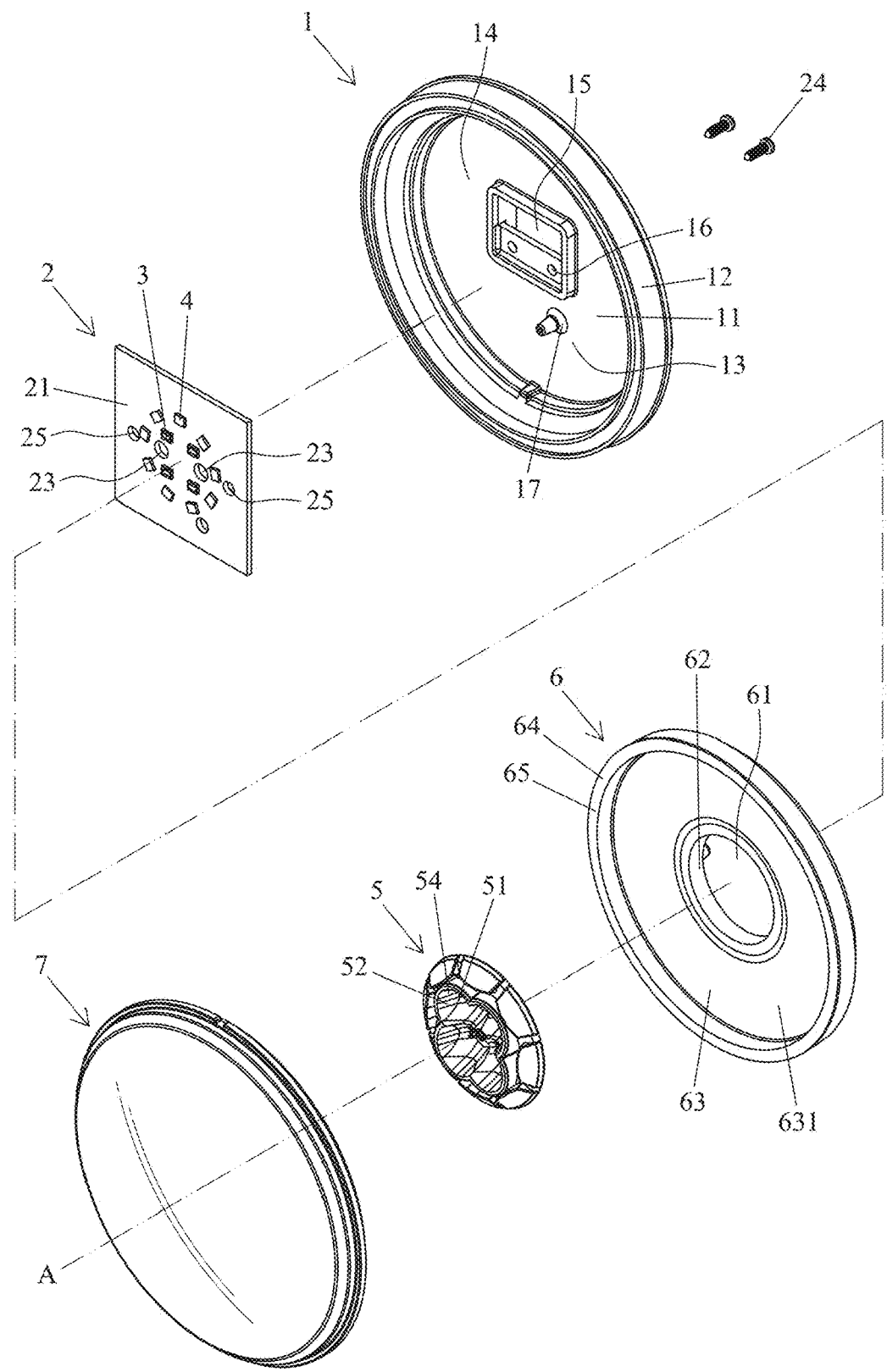
FIG. 1 is a front, exploded, perspective view of a vehicle light of a first embodiment according to the present invention.
Figure 2:
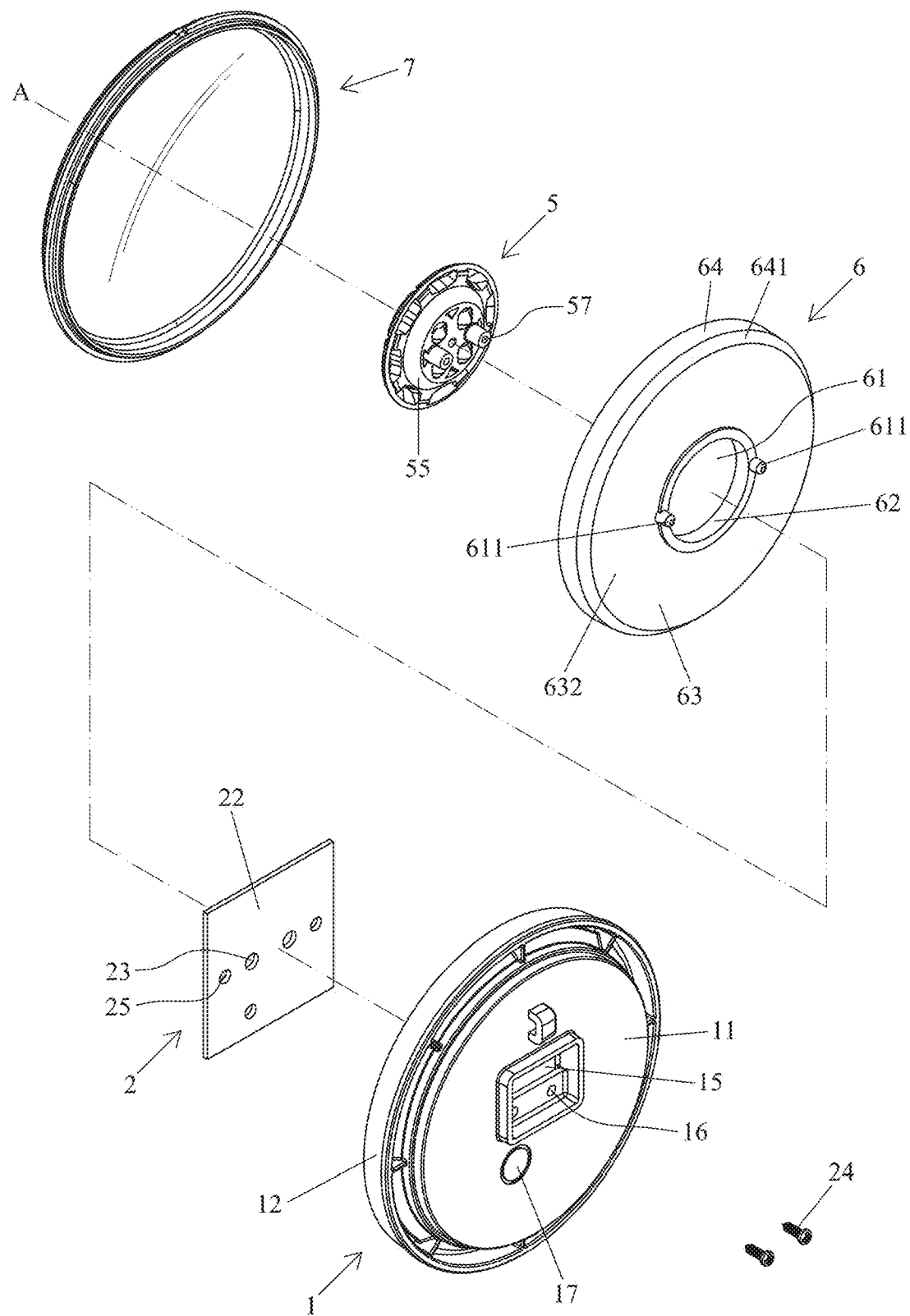
FIG. 2 is a rear, exploded, perspective view of the vehicle light of FIG. 1.
Figure 3:
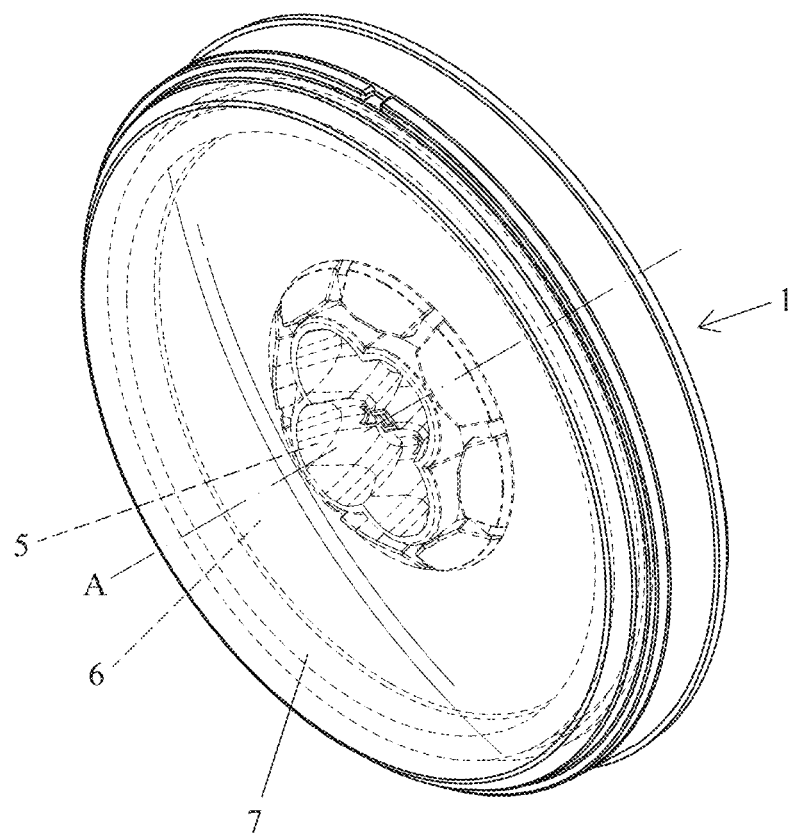
FIG. 3 is a perspective view of the vehicle light of FIG. 1.

With reference to FIGS. 1-5, a vehicle light of a first embodiment according to the present invention comprises a base 1, a circuit board 2, at least one first light emitter 3, a plurality of second light emitters 4, a reflective seat 5, a lens 6, and a front cover 7 which is transmittable to light. The vehicle light includes a longitudinal axis A extending in a front-rear direction. The base 1 includes a bottom board 11 and a peripheral wall 12 extending forwards along a periphery of the bottom board 11 and surrounding the longitudinal axis A. A compartment 13 is defined between the bottom board 11 and the peripheral wall 12 and has an opening 14 at a front end thereof. The bottom board 11 further includes a slot 15, two fixing holes 16, and a vent 17.

The circuit board 2 is mounted in the compartment 13 of the base 1. The circuit board 2 is disposed on a front side of the bottom board 11 of the base 1 and includes a front surface 21 and a rear surface 22. Furthermore, the circuit board 2 includes two fixing holes 23. Two fasteners 24 extend through the two fixing holes 16 in the bottom board 11 and the two fixing holes 23 in the circuit board 2 for assembling purposes. The rear surface 22 of the circuit board 2 is electrically connected to an electric wire (not shown) extending through the through-hole 15 of the bottom board 11 for electrical connection with an external device. The circuit board 2 further includes two insertion holes 25. The longitudinal axis A according to the present invention can, but not limited to, be a center axis.

The at least one first light emitter 3 can be an LED (light emitting diode) and is disposed on the front surface 21 of the circuit board 2. In this embodiment, the vehicle light includes four first light emitters 3. Nevertheless, the vehicle light can include, but not limited to, only one first light emitter 3 or light emitters 3 of any desired number. The light emitters 3 can be arranged in a circumferential direction about the longitudinal axis A.

The plurality of second light emitters 4 can be LEDs, is disposed on the front surface 21 of the circuit board 2, and is arranged in a circumferential direction about the longitudinal axis A. The plurality of second light emitters 4 is configured to emit light rays that move towards the front. A spacing between each of the plurality of second light emitters 4 and the longitudinal axis A is larger than a spacing between the at least one first light emitter 3 and the longitudinal axis A. The at least one first light emitter 3 is surrounded by the plurality of second light emitters 4. In this non-restrictive embodiment, the vehicle light includes nine second light emitters 4. Nevertheless, the number of the second light emitters 4 can be varied.

The reflective seat 5 is disposed in the compartment 13 of the base 1 and is located in front of the at least one first light emitter 3 and the plurality of second light emitters 4. The reflective seat 5 includes an annular portion 51 surrounding the longitudinal axis A, extending forwards, and tapering rearwards. The reflective seat 5 includes a central portion having at least one first reflective face 54 and at least one hollow portion 52 located in a center of the annular portion 51. The at least one first reflective face 54 substantially surrounds the at least one hollow portion 52. In other words, the at least one first reflective face 54 is an inner face of the reflective seat 5. In another embodiment, two or more first reflective faces 54 substantially surround the at least one hollow portion 52. The term "substantially surround" means the two or more first reflective faces 54 are contiguous or adjacent to each other. In a case that the reflective seat 5 includes only one first reflective face 54, the first reflective face 54 completely or partially surrounds the at least one hollow portion 52. In this embodiment, the reflective seat 5 includes four hollow portions 52 respectively corresponding to the four first light emitters 3 and four first reflective faces 54 respectively surrounding the four hollow portions 52. In other non-restrictive embodiments, the number of the hollow portions 52 can be one, two, or more. Furthermore, each hollow portion 52 can correspond to one or more first light emitter 3. In this embodiment, each hollow portion 52 corresponds to a respective one of the first light emitters 3. Furthermore, the light rays emitted by each light emitter 3 are reflected forwards after reflection by the respective first reflective face 54.

It is noted that the central portion of the reflective seat 5 includes at least one hollow portion 52. In a case that the reflective seat 5 includes only one hollow portion 52, the hollow portion 52 is located on or adjacent to the longitudinal axis A. In another case that the reflective seat 5 includes plural hollow portions 52, the plural hollow portions 52 surround the longitudinal axis A (or surrounds and is close to the longitudinal axis A). The term "central portion" or "center" used herein has the same meaning as commonly understood by one of ordinary skill in the art to which this disclosure belongs.

The reflective seat 5 further includes a second reflective face 55 located at a rear end of the annular portion 51 and located in front of the plurality of second light emitters 4. The second reflective face 55 is configured to reflect the light rays from the plurality of second light emitters 4 to a light incoming face 62 of the lens 6. The reflective seat 5 further includes a side annular portion 56 extending radially outwards from a front end of the annular portion 51 and abutting the first face 631. Furthermore, the reflective seat 5 further includes two assembling holes 57 in a rear end thereof for coupling with the two fasteners 24. The reflective seat 5 can, but not limited to, be comprised of a single member or more than one member.

The lens 6 is mounted in the compartment 13 of the base 1 and is located in front of the circuit board 2. The lens 6 includes a through-hole 61 having a diameter larger than a distribution area of the plurality of second light emitters 4. The lens 6 further includes two pegs 611 coupled with the two insertion holes 25 of the circuit board 2. The lens 6 includes the light incoming face 62, an extension portion 63, a light output portion 64, and a light outgoing face 65. The light rays emitted from the plurality of second light emitters 4 and incident to the light incoming face 62 are reflected by the extension portion 63 and the light output portion 64 and then exit forwards via the light outgoing face 65. The light incoming face 62 is located on an annular wall of the through-hole 61. The light incoming face 62 extends in a direction parallel to and surrounding the longitudinal axis A. The light incoming face 62 is adjacent to but spaced from the second reflective face 55. In an alternative embodiment, the light incoming face 62 can be contiguous to the second reflective face 55.

The extension portion 63 extends from the light incoming face 62 away from the longitudinal axis A in a first direction approximately perpendicular to the longitudinal axis A. The extension portion 63 includes a first face 631 and a second face 632 substantially parallel to the first face 631 and spaced from the first face 631 in the first direction. The side annular portion 56 abuts a portion of the first face 631 to provide a stable assembly. Furthermore, the light output portion 64 is located on an end of the extension portion 63 remote from the longitudinal axis A. The light output portion 64 includes a third face 641. The third face 641 extends forwards away from the longitudinal axis A, and is connected to the second face 632. The light output portion 64 extends forwards in a direction substantially parallel to the longitudinal axis A. The light outgoing face 65 is located at a front end of the light output portion 64 and is substantially perpendicular to the longitudinal axis A.

The front cover 7 is disposed at the opening 14 at the front end of the base 1 and is configured to close the compartment 13. In a non-respective embodiment, the light outgoing face 65 of the lens 6 is contiguous or adjacent to the front cover 7. As viewed from the front of the front cover 7, the lens 6 is in the form of the disc shape in this embodiment. In alternative embodiments, the lens 6 can be a sheet, a board, or a strip and can be annular, non-annular, or irregular.

Figure 4:
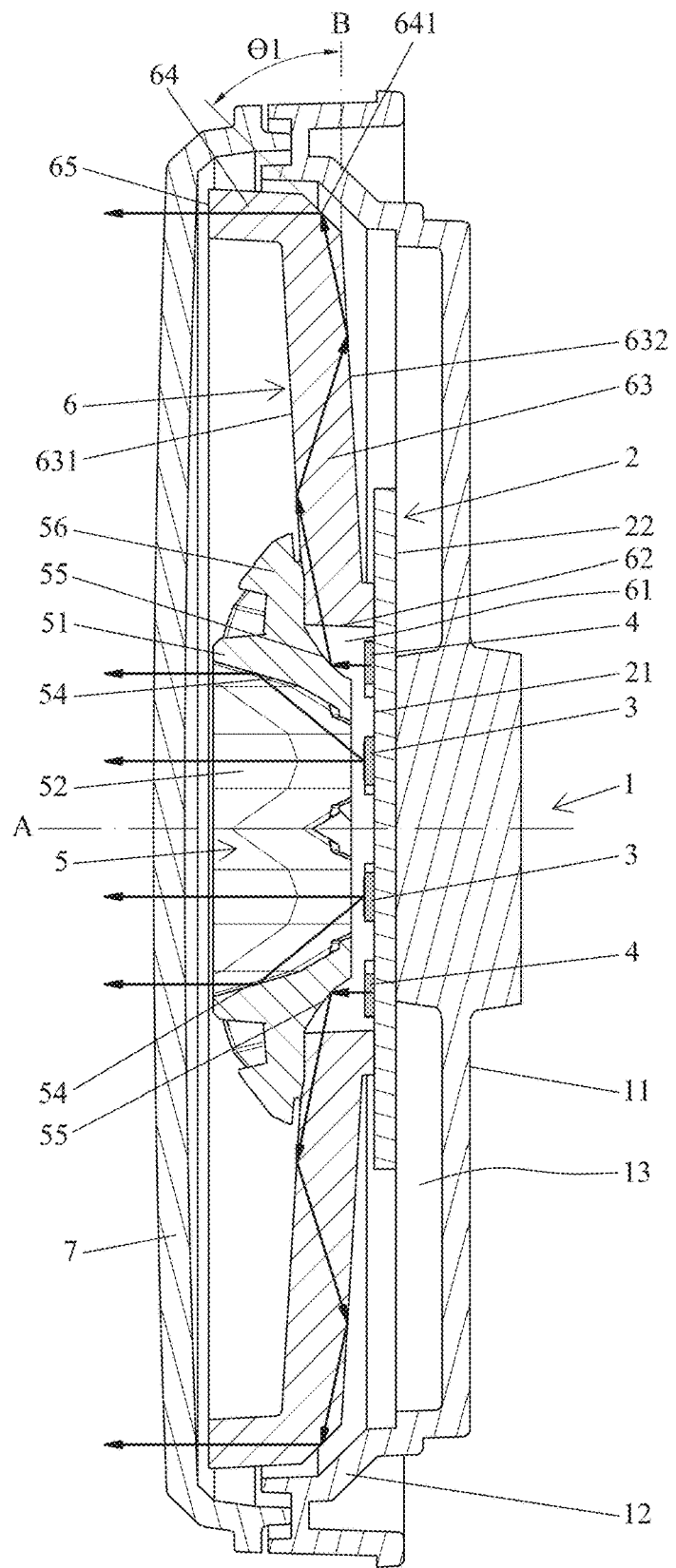
FIG. 4 is a cross sectional view of the vehicle light of FIG. 3, illustrating illumination of the vehicle light.
Figure 5:
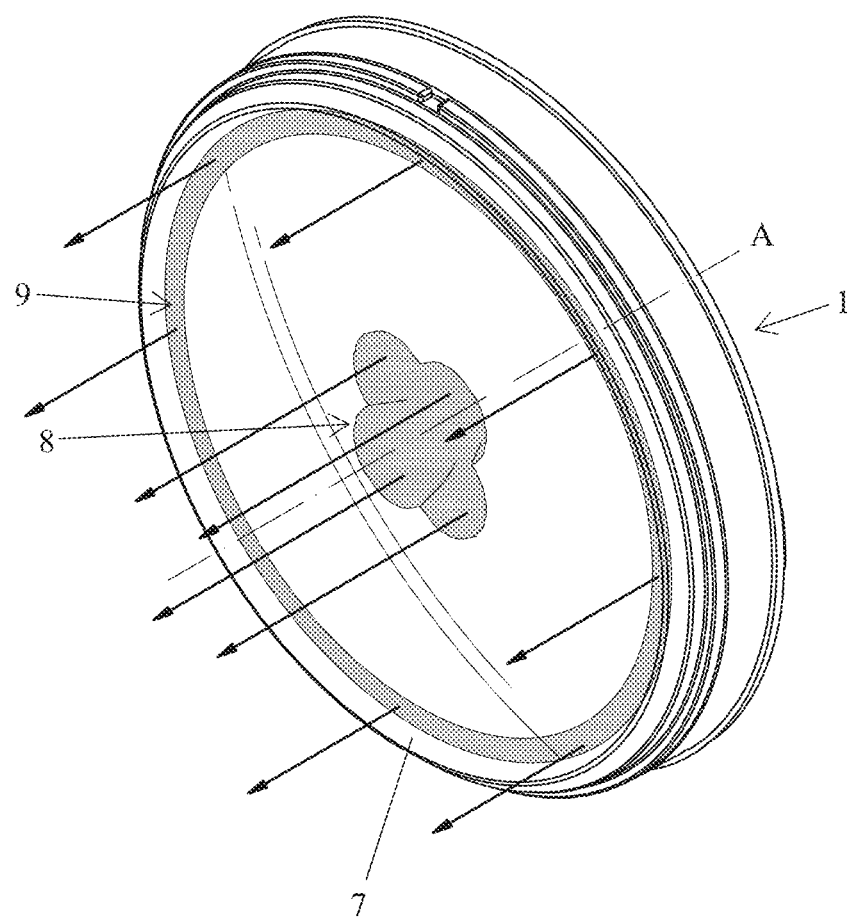
FIG. 5 is a diagrammatic view illustrating an illuminating status of the vehicle light of FIG. 3.
Figure 6:
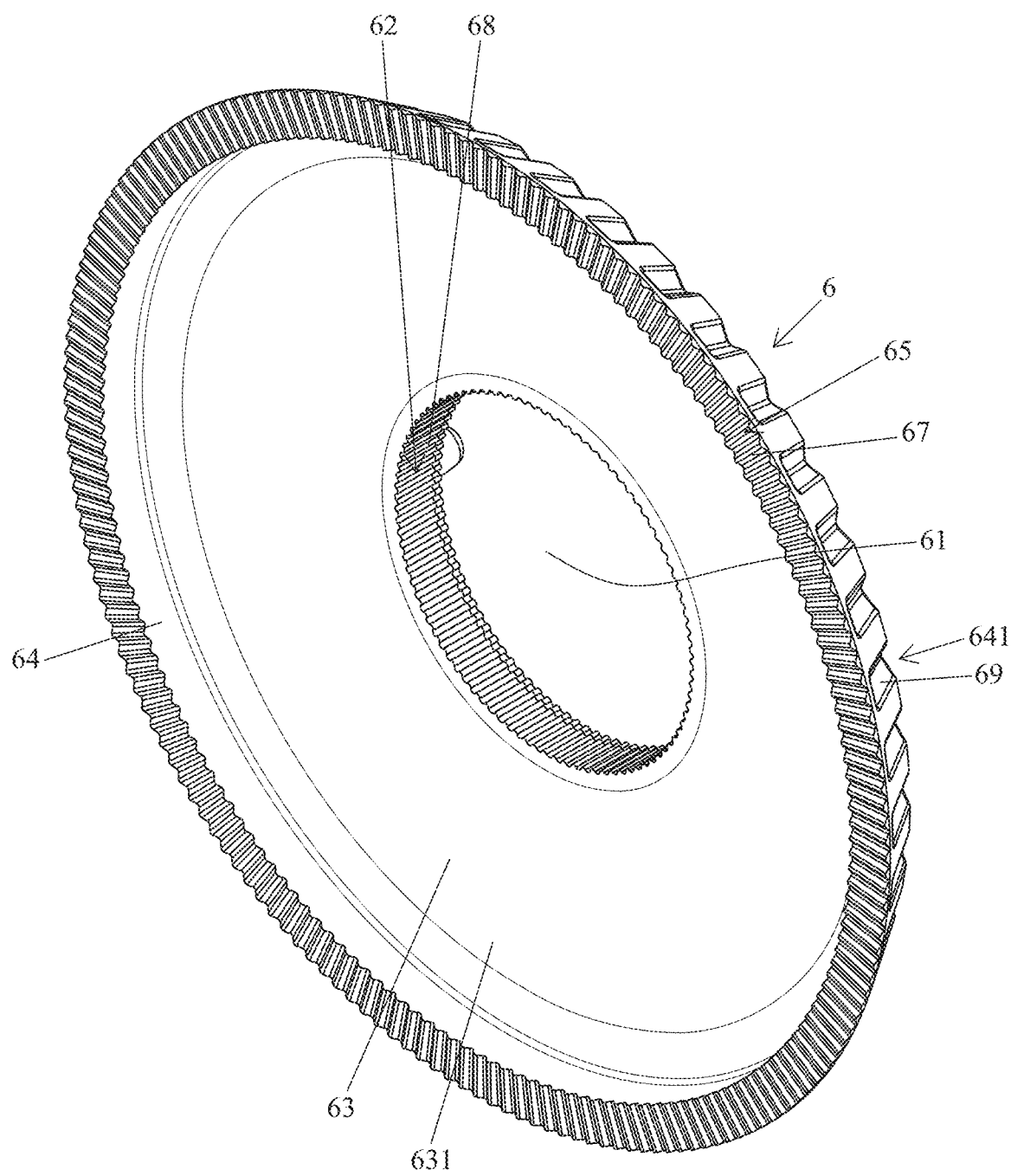
FIG. 6 is a front, perspective view of a lens of a vehicle light of a second embodiment according to the present invention.
Figure 7:
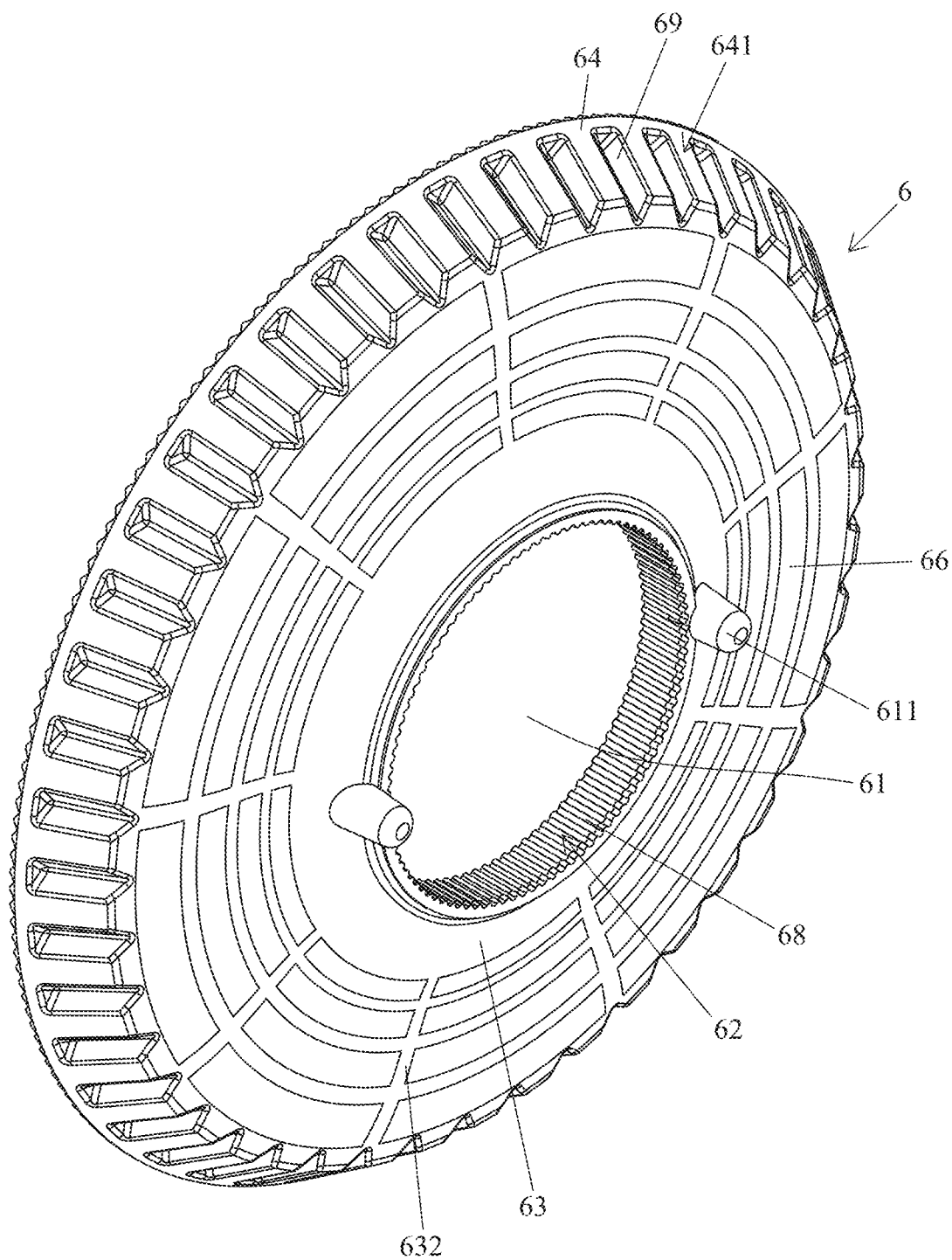
FIG. 7 is a rear, perspective view of the lens of FIG. 6.

As shown in FIGS. 4 and 5, a portion of the light rays emitted from the first light emitters 3 directly passes through the hollow portions 52 of the reflective seat 5 and transmits through the front cover 7. A portion of the light rays directly passed through the hollow portions 52 and another portion of the light rays reflected by the first reflective faces 54 form a first lighting pattern 8 and then transmit through the front cover 7.

The light rays emitted from the plurality of second light emitters 4 are concentratively reflected by the second reflective face 55 of the reflective seat 5 to transmit through the light incoming face 62 to thereby enter the extension portion 63. Then, the light rays are reflected by the first face 631 and the second face 632 of the extension portion 63 to the third face 641 of the light output portion 64. Then, the light rays are reflected by the third face 641 to transmit through the light outgoing face 65, forming a second lighting pattern 9 that is annular. Then, the light rays transmit through the front cover 7. The second lighting pattern 9 is different from the first lighting pattern 8 and has a larger spacing to increase the overall illumination area, providing a better alarming effect. Furthermore, the second reflective face 55 is a multi-focus curved face, such that most light rays can be more perpendicular to the light incoming face 62, increasing the light incoming efficiency of the lens 6. Thus, the light output efficiency of the light outgoing face 65 of the lens 6 can be increased. Furthermore, as shown in FIG. 4, an acute angle θ1 between the third face 641 and a horizontal axis B is smaller than 48°, and wherein the horizontal axis B is perpendicular to the longitudinal axis A, such that most incident light rays perpendicular to (or approximately perpendicular to) the light incoming face 62 can create a total reflection effect at the third face 641, thereby reflecting the light rays to the light outgoing face 65. Thus, the light output efficiency is increased. In brief, a better light output efficiency can be provided when the acute angle θ1 is smaller than 48°.

The reflective seat 5 according to the present invention is used for reflecting light rays emitted from the at least one first light emitter 3 and the plurality of second light emitters 4 and outputting light rays, thereby reducing the component costs. Furthermore, the at least one first light emitter 3 and the plurality of second light emitters 4 are concentratively distributed and do not have to be located in the light outgoing face 65 of the lens 6, thereby reducing the size of the circuit board 2 and reducing the costs of the circuit board 2.

The vehicle light according to the present invention can be used as a vehicle tail light. Ordinarily, the plurality of second light emitters 4 outputs the second lighting pattern 9. During braking, the at least one first light emitter 3 and the plurality of second light emitters 4 simultaneously emit light rays to form the first lighting pattern 8 and the second lighting pattern 9. The at least one first light emitter 3 and/or the plurality of second light emitters 4 can, but not limited to, be used as a directional light or for other alarming effects. Furthermore, in a non-restrictive embodiment, the vehicle light according to the present invention can include at least one reflecting device and/or at least one refraction device to reflect and/or refract the light rays from the plurality of second light emitters 4 to the lens 6.

FIGS. 6-9 show a vehicle light of a second embodiment according to the present invention similar to the first embodiment. The second embodiment is different from the first embodiment by the structure of the lens 6. Specifically, in the second embodiment, the second face 632 of the lens 6 includes a pattern portion 66. The pattern portion 66 can be a texture structure and can be set to provide a desired pattern distribution, such that the second surface 632 is not used for total reflection. In another embodiment, the pattern portion 66 can, but not limited to, include a toothed structure, a recessed structure, a protruding structure, or a texture structure. The pattern portion 66 can destroy the total reflection effect. When viewed from the front of the front cover 7, the above pattern distribution not only provides an illuminating effect but also provides an aesthetic appearance effect.

In the second embodiment, the lens 6 includes a plurality of first microstructures 67 disposed on the light outgoing face 65. The light rays transmit through the light outgoing face 65 can be refracted by the plurality of first microstructures 67 into diffused light rays to increase the light output efficiency while providing a uniform distribution effect of the outputted light rays.

In the second embodiment, the lens 6 includes a plurality of second microstructures 68 disposed on the light incoming face 62. The light rays reflected by the second reflective face 55 to the light incoming face 62 of the lens 6 can be refracted by the plurality of second microstructures 68 into diffused light rays and then enter the extension portion 63, such that the light rays in the extension portion 63 can have a more uniform distribution effect.

In the second embodiment, the lens 6 includes a plurality of third microstructures 69 disposed on the third face 641. The light rays passing through the extension portion 63 of the lens 6 and incident to the third face 641 can be refracted by the plurality of third microstructures 69 to provide a more uniform distribution effect. Furthermore, the plurality of third microstructures 69 can destroy the total reflection effect, such that when viewed from the front cover 7, the distribution of the plurality of third microstructures 69 provides not only an illumination effect but also an aesthetic appearance effect.

The plurality of first microstructures 67 and/or the plurality of second microstructures 68 according to the present invention can, but not limited to, be continuous or non-continuous toothed structure, or continuous or non-continuous recessed structure, protruding structure, or texture structure. The plurality of third microstructures 69 can, but not limited to, be continuous or non-continuous toothed structure, or continuous or non-continuous recessed structure, protruding structure, or texture structure.

Figure 8:
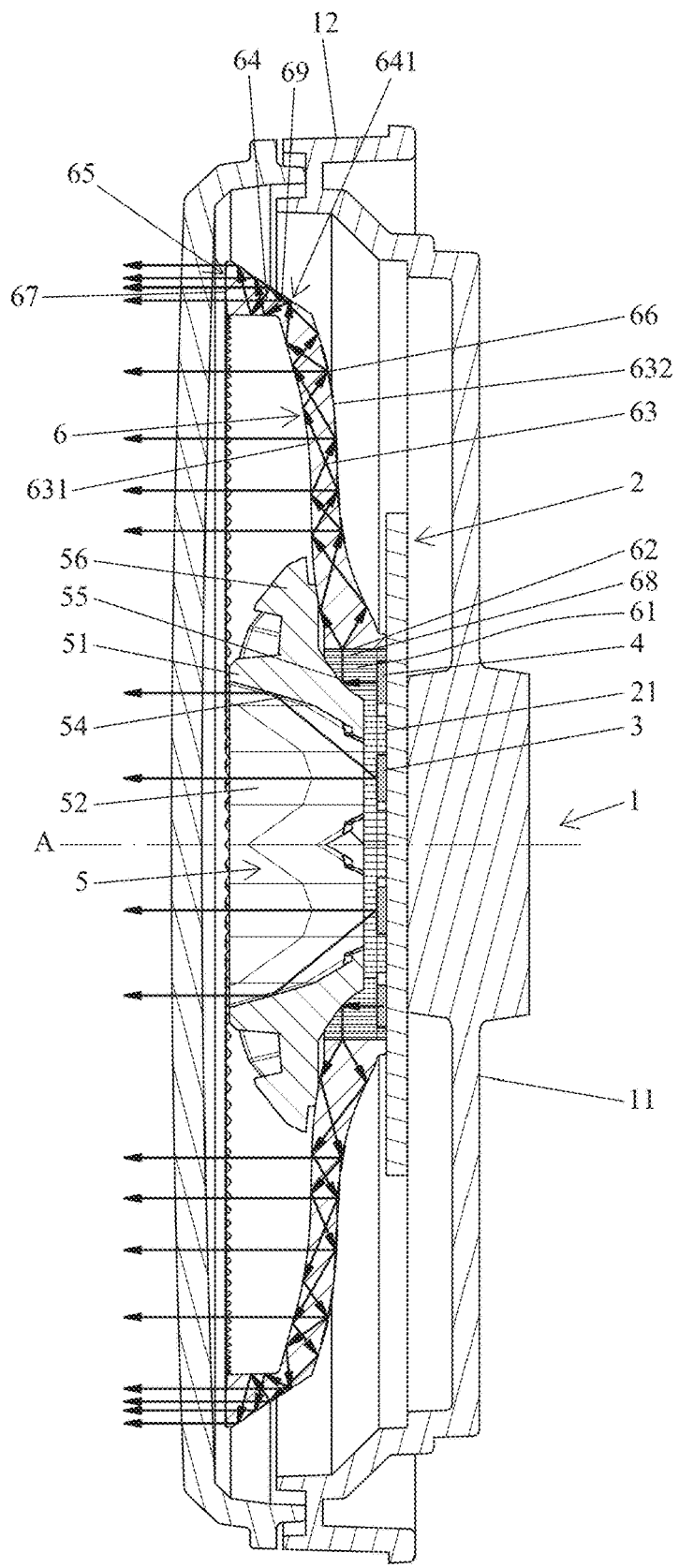
FIG. 8 is a diagrammatic view illustrating illumination of the vehicle light of the second embodiment according to the present invention.
Figure 9:
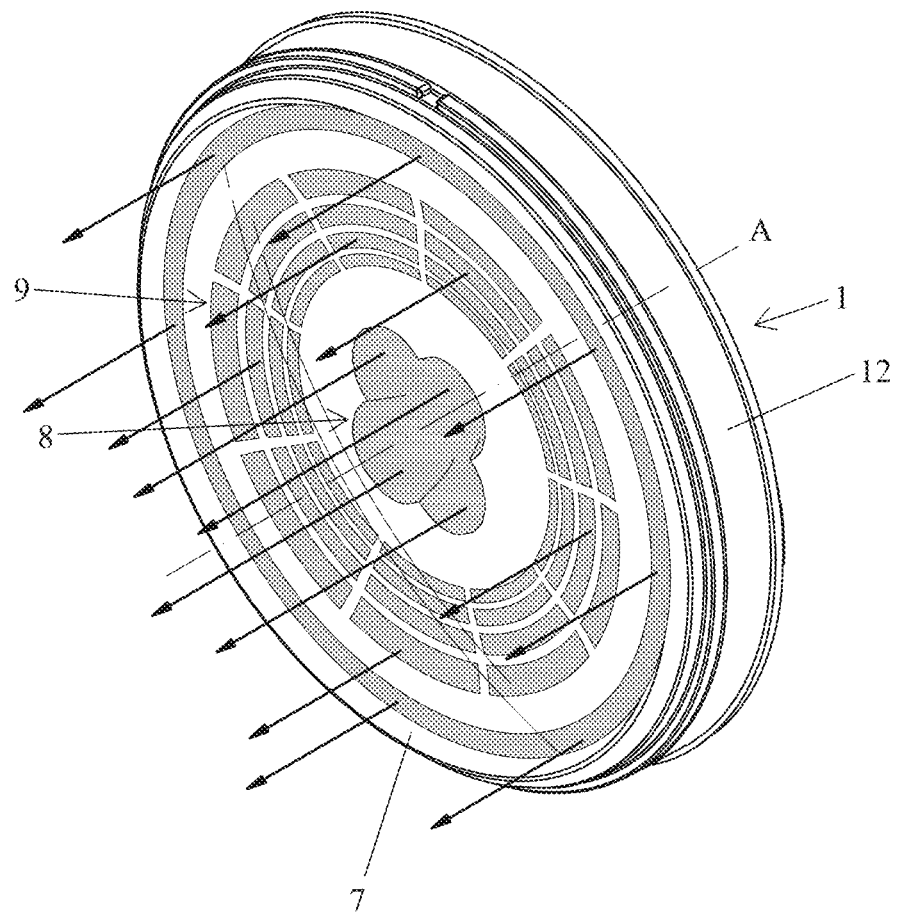
FIG. 9 is a diagrammatic view illustrating an illuminating status of the vehicle light of FIG. 8.
Figure 10:
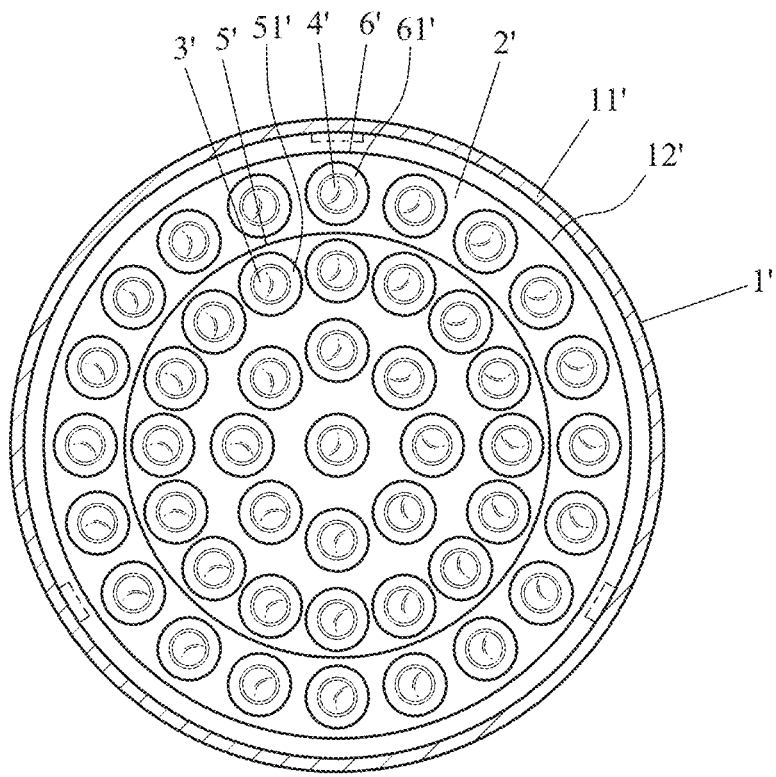
FIG. 10 is a cross sectional view of a conventional vehicle lamp viewed from front.

As shown in FIGS. 8 and 9, the first lighting pattern 8 provided by the second embodiment is identical or similar to the first lighting pattern 8 provided by the first embodiment. When viewed from the front cover 7, the lens 6 according to the present invention includes the second lighting pattern 9 outputted by the light outgoing face 65 and the pattern portion 66, which is better than the first embodiment in the alarming effect and the sense of quality of the lighting pattern. For ease of explanation, FIG. 9 is merely a diagrammatic view illustrating the illumination status of the second embodiment according to the present invention. In fact, when viewed from the front cover 7, the plurality of third microstructures 69 of the lens 6 also outputs light rays forming a portion of the second lighting pattern 9.

In an alternative embodiment similar to the second embodiment, the lens 6 includes the pattern portion 66 and the plurality of first microstructures 67 but does not include the plurality of second microstructures 68 and the plurality of third microstructures 69. In this embodiment, the lumen of the light rays from the light outgoing face 65 is about 45-50% of the total lumen of the light rays emitted from the plurality of second light emitters 4.

In view of the foregoing, the vehicle light according to the present invention can output a better diffusive type lighting pattern while reducing the components. The lens 6 according to the present invention does not have to include the pattern portion 66 and the plurality of first, second, and third microstructures, 67, 68, and 69. Furthermore, the lens 6 according to the present invention can include any combination of the pattern portion 66, the plurality of first microstructures 67, the plurality of second microstructures 68, and the plurality of third microstructures 69.

Although specific embodiments have been illustrated and described, numerous modifications and variations are still possible without departing from the scope of the invention. The scope of the invention is limited by the accompanying claims.

The invention claimed is:

1. A vehicle light including a longitudinal axis extending in a front-rear direction, the vehicle light comprising:
    a base including a compartment having an opening at a front end thereof;
    a circuit board mounted in the compartment of the base;
    at least one first light emitter disposed on the circuit board;
    a plurality of second light emitters disposed on the circuit board;
    a reflective seat disposed in the compartment of the base and located in front of the at least one first light emitter and the plurality of second light emitters, wherein the reflective seat includes a central portion having at least one first reflective face and at least one hollow portion, wherein the at least one first reflective face substantially surrounds the at least one hollow portion, wherein the at least one hollow portion is aligned with the at least one first light emitter, and wherein the at least one first light emitter is configured to emit light rays which are reflected in a forward direction toward the opening by the at least one first reflective face;
    a lens including a light incoming face that is substantially perpendicular to a light outgoing face, wherein the lens is substantially disposed in the compartment and the plurality of second light emitters is configured to emit light rays which are incident to the light incoming face and which exits forwards via the light outgoing face, wherein the lens further includes an extension portion and a light output portion, and wherein the light output portion is located on an end of the extension portion remote from the longitudinal axis, wherein the light outgoing face is located at a front end of the light output portion, and wherein the light rays emitted from the plurality of second light emitters and incident to the light incoming face are reflected by the extension portion and the light output portion and then exit forwards via the light outgoing face; and
    a front cover which is transmittable to light, wherein the front cover is disposed at the opening at the front end of the base and is configured to close the compartment.

2. The vehicle light as claimed in claim 1, wherein the circuit board includes a front surface, and wherein the at least one first light emitter and the plurality of second light emitters are disposed on the front surface of the circuit board.

3. The vehicle light as claimed in claim 2, wherein the plurality of second light emitters is disposed on the front surface of the circuit board and surrounds the longitudinal axis, and wherein a spacing between each of the plurality of second light emitters and the longitudinal axis is larger than a spacing between the at least one first light emitter and the longitudinal axis.

4. The vehicle light as claimed in claim 1, wherein the lens includes a plurality of first microstructures disposed on the light outgoing face.

5. The vehicle light as claimed in claim 4, wherein the lens includes a plurality of second microstructures disposed on the light incoming face.

6. The vehicle light as claimed in claim 1, wherein the lens is mounted in the compartment of the base and is located in front of the circuit board, and wherein the lens includes a through-hole having a diameter larger than a distribution area of the plurality of second light emitters.

7. The vehicle light as claimed in claim 6, wherein the light incoming face is located on an annular wall of the through-hole, and wherein the extension portion extends from the light incoming face away from the longitudinal axis in a first direction approximately perpendicular to the longitudinal axis.

8. The vehicle light as claimed in claim 7, wherein the extension portion of the lens includes a first face and a second face substantially parallel to the first face and spaced from the first face in the first direction, wherein the light output portion includes a third face, wherein the third face extends forwards away from the longitudinal axis, and is connected to the second face, wherein the light output portion extends forwards in a direction substantially parallel to the longitudinal axis, and wherein the light outgoing face located at the front end of the light output portion is substantially perpendicular to the longitudinal axis.

9. The vehicle light as claimed in claim 8, wherein the second face of the lens includes a pattern portion.

10. The vehicle light as claimed in claim 9, wherein the pattern portion is a texture structure.

11. The vehicle light as claimed in claim 8, wherein the lens includes a plurality of third microstructures disposed on the third face.

12. The vehicle light as claimed in claim 8, wherein an acute angle between the third face and a horizontal axis is smaller than 48°, and wherein the horizontal axis is perpendicular to the longitudinal axis.

13. The vehicle light as claimed in claim 8, wherein the reflective seat includes an annular portion surrounding the longitudinal axis, extending forwards, and tapering rearwards, and wherein the reflective seat further includes a side annular portion extending radially outwards from a front end of the annular portion and abutting the first face of the lens.

14. The vehicle light as claimed in claim 1, wherein a lumen of the light rays from the light outgoing face is about 45-50% of a total lumen of the light rays emitted from the plurality of second light emitters.

15. The vehicle light as claimed in claim 1, wherein the light outgoing face of the lens is contiguous or adjacent to the front cover.

16. The vehicle light as claimed in claim 1, wherein the reflective seat includes an annular portion surrounding the longitudinal axis, extending forwards, and tapering rearwards, wherein the at least one hollow portion is located in a center of the annular portion, wherein the reflective seat further includes a second reflective face located at a rear end of the annular portion and located in front of the plurality of second light emitters, and wherein the second reflective face is configured to reflect the light rays from the plurality of second light emitters to the light incoming face of the lens.

17. The vehicle light as claimed in claim 16, wherein the light incoming face of the lens is contiguous or adjacent to the second reflective face.

18. The vehicle light as claimed in claim 16, wherein the second reflective face is a multi-focus curved face.

19. A vehicle light including a longitudinal axis extending in a front-rear direction, the vehicle light comprising:
    a base including a compartment having an opening at a front end thereof;
    a plurality of light emitters;
    a reflective seat disposed in the compartment of the base and located in front of the plurality of light emitters, wherein the reflective seat includes an annular portion surrounding the longitudinal axis, extends forwards, and tapering rearwards, wherein the reflective seat further includes a reflective face located at a rear end of the annular portion and located in front of the plurality of light emitters, and wherein the reflective face is configured to reflect the light rays from the plurality of light emitters to a light incoming face of a lens;

the lens including the light incoming face that is substantially perpendicular to a light outgoing face, wherein the lens is substantially disposed in the compartment and the plurality of light emitters is configured to emit light rays which are incident to the light incoming face and which move outwards via the light outgoing face; and a front cover which is transmittable to light, wherein the front cover is disposed at the opening at the front end of the base and is configured to close the compartment, wherein the lens further includes an extension portion and a light output portion, and wherein the light output portion is located on an end of the extension portion remote from the longitudinal axis, wherein the light outgoing face is located at a front end of the light output portion, and wherein the light rays emitted from the plurality of light emitters and incident to the light incoming face are reflected by the extension portion and the light output portion and then exit forwards via the light outgoing face.

* * * * *